US012794312B2

(12) United States Patent
Morishima

(10) Patent No.: US 12,794,312 B2
(45) Date of Patent: Nov. 10, 2026

(54) COMPRESSOR AND SEALING MEMBER

(71) Applicant: Carrier Japan Corporation, Tokyo (JP)

(72) Inventor: Akira Morishima, Shizuoka (JP)

(73) Assignee: Carrier Japan Corporation, Tokyo (JP)

(*) Notice: Subject to any disclaimer, the term of this patent is extended or adjusted under 35 U.S.C. 154(b) by 94 days.

(21) Appl. No.: 18/869,671

(22) PCT Filed: May 27, 2022

(86) PCT No.: PCT/JP2022/021755
§ 371 (c)(1),
(2) Date: Nov. 26, 2024

(87) PCT Pub. No.: WO2023/228410
PCT Pub. Date: Nov. 30, 2023

(65) Prior Publication Data

US 2026/0246333 A1 Aug. 20, 2026

(51) Int. Cl.
*H02K 5/22* (2006.01)
*F25B 31/02* (2006.01)

(52) U.S. Cl.
CPC ............ *H02K 5/225* (2013.01); *F25B 31/026* (2013.01)

(58) Field of Classification Search
CPC .. H02K 5/15; H02K 5/10; H02K 5/12; H02K 5/124; H02K 5/1285; H02K 5/132;
(Continued)

(56) References Cited

U.S. PATENT DOCUMENTS 1,822,859 A * 9/1931 Perkins .................... H02K 5/08 310/410
2,280,965 A * 4/1942 Mueller ............... H02K 5/1732 310/90
(Continued)

FOREIGN PATENT DOCUMENTS

DE 2939560 A1 * 9/1979
JP H08-049679 2/1996
(Continued)

OTHER PUBLICATIONS

International Search Report dated Jul. 12, 2022 issued in PCT/JP2022/021755.
(Continued)

*Primary Examiner* — Maged M Almawri
(74) *Attorney, Agent, or Firm* — DLA PIPER LLP (US)

(57) ABSTRACT

A compressor includes a casing a compression mechanism housed in the casing a motor housed in the casing and configured to drive the compression mechanism a terminal provided on an upper portion of the casing and configured to be connectable to a lead wire for supplying power to the motor a terminal cover arranged to surround the terminal, and a sealing member disposed between the terminal cover and the upper portion of the casing. The terminal cover includes an opening opened in a direction perpendicular to a central axis of the casing, and the lead wire is able to be led out from inside the terminal cover through the opening. The sealing member includes a sealing-member main-body and a protrusion. The sealing-member main-body is sheet-shaped and has a sealing portion to be sandwiched between the upper portion of the casing and an edge of the terminal cover that faces the upper portion. The protrusion is formed to protrude from the sealing-member main-body (31) and occupies at least a part of a space of the opening in
(Continued)

x-x projection onto a plane parallel to the central axis of the casing.

7 Claims, 8 Drawing Sheets

(58) Field of Classification Search
CPC ...... H02K 5/136; H02K 5/1732; H02K 5/225; H02K 7/08; H02K 7/083; H02K 7/085; F25B 31/026
USPC .......... 310/71
See application file for complete search history.

(56) References Cited

U.S. PATENT DOCUMENTS

| | | | | | |
|---|---|---|---|---|---|
| 2,763,796 | A * | 9/1956 | Happe | H02K 9/06 310/410 |
| 2,874,008 | A * | 2/1959 | Wilner | H02K 5/1732 384/220 |
| 3,234,417 | A * | 2/1966 | Tolmie | H02K 1/17 310/410 |
| 3,444,402 | A * | 5/1969 | Cartier | H02K 23/04 310/46 |
| 3,873,861 | A * | 3/1975 | Halm | H02K 1/185 310/410 |
| 4,896,239 | A * | 1/1990 | Ghose | H02K 7/1004 360/267 |
| 4,899,432 | A * | 2/1990 | Adam | H02K 5/1672 310/90 |
| 4,933,581 | A * | 6/1990 | Shramo | H02K 21/14 310/156.55 |
| 5,325,007 | A * | 6/1994 | Huss | H02K 3/46 310/43 |
| 6,124,656 | A * | 9/2000 | Jensen | B65G 39/02 310/90 |
| 6,388,351 | B1 * | 5/2002 | Fisher | H02K 5/1732 310/90 |
| 8,283,841 | B2 * | 10/2012 | Lin | H02K 5/161 310/90 |
| 8,415,840 | B2 * | 4/2013 | Liu | H02K 5/1672 310/90 |
| 9,006,961 | B2 * | 4/2015 | Helmi | H02K 3/50 310/71 |
| 10,186,928 | B2 * | 1/2019 | Firat | H02K 11/25 |
| 10,312,770 | B2 * | 6/2019 | Jones | H02K 5/225 |
| 10,389,201 | B2 * | 8/2019 | Hamagishi | H02K 5/10 |
| 10,439,464 | B2 * | 10/2019 | Zhi | H02K 5/161 |
| 11,228,223 | B2 * | 1/2022 | Haubenstricker | H02K 15/00 |
| 2003/0086630 | A1 * | 5/2003 | Bramel | H02K 11/40 384/476 |
| 2004/0178692 | A1 * | 9/2004 | Wright | H02K 5/15 310/401 |
| 2006/0181168 | A1 * | 8/2006 | Hargraves | F04B 17/03 310/90 |
| 2011/0037352 | A1 * | 2/2011 | Lin | H02K 5/15 310/402 |
| 2019/0115799 | A1 * | 4/2019 | Horng | F16C 25/083 |
| 2019/0356087 | A1 | 11/2019 | Pamart | |
| 2019/0372421 | A1 * | 12/2019 | Amaya | H02K 3/34 |
| 2022/0337118 | A1 * | 10/2022 | Shirai | F16C 35/063 |
| 2023/0268793 | A1 * | 8/2023 | Tong | H02K 7/145 310/51 |
| 2023/0344325 | A1 * | 10/2023 | Hwang | H02K 7/14 |

FOREIGN PATENT DOCUMENTS

| | | | | |
|---|---|---|---|---|
| JP | H 10-284852 | | 10/1998 | |
| JP | 2010053786 | A * | 3/2010 | |
| JP | 2014029119 | A * | 2/2014 | |
| JP | 2019035385 | A * | 3/2019 | |
| JP | 2019-200992 | | 11/2019 | |
| JP | 2021-032129 | | 3/2021 | |
| JP | 2021032129 | A * | 3/2021 | |
| WO | WO-2004092582 | A2 * | 10/2004 | H02K 5/1732 |

OTHER PUBLICATIONS

Written Opinion dated Jul. 12, 2022 issued in PCT/JP2022/021755.
International Preliminary Report on Patentability dated Nov. 7, 2024 issued in PCT/JP2022/021755.

* cited by examiner z-z

COMPRESSOR AND SEALING MEMBER

CROSS REFERENCE TO RELATED APPLICATIONS

This application is a U.S. National Stage Application of International Application No. PCT/JP2022/021755 filed May 27, 2022, The entirety of the above-listed application is incorporated herein by reference.

TECHNICAL FIELD

Embodiments of the present invention relate to a compressor and a sealing member.

BACKGROUND

In a compressor to be applied to a freezer, a refrigerator, a water heater, an air conditioner, and the like, an upper portion of a casing (also called an upper casing and hereafter referred to as "the casing upper-portion") for housing a compression mechanism and a motor that drives the compression mechanism is provided with terminals for supplying power to the motor. Further, a cover member (hereafter referred to as "the terminal cover") configured to surround and protect the terminals and their installation base is attached to the casing upper-portion. The terminal cover is disposed on the casing upper-portion with a sealing member interposed therebetween.

Patent Document 1 discloses a compressor provided with a flat sheet-shaped sealing member that is disposed between the casing upper-portion and a protective cover for the terminals and is fastened to the casing upper-portion together with the protective cover.

PRIOR ART DOCUMENT

Patent Document

[Patent Document 1] JP H08-049679 A

SUMMARY

Problem to be Solved by Invention

In general, a compressor having the above-described configuration is installed vertically in the state where the central axis of the casing stands vertically, i.e., in the state where the compression mechanism and the motor are stacked one above the other inside the casing. Lead wires to be connected to the terminals of the compressor in such a state are pulled out laterally from the inside to the outside of the terminal cover through an opening provided in a side wall of the terminal cover.

If the opening of the terminal cover is large enough to allow the movement of the lead wires, the lead wires may bend due to their own weight or deform by being subjected to external force so as to move within the opening, and thereby a moment acts on terminal members of the lead wires to be connected to the terminals. Accordingly, there is a concern that this moment reduces adhesion between the terminals of the casing upper-portion and the terminal members of the lead wires so as to cause loose connection between both and lead to a loss of stability in power supply to the motor.

Since the sealing member is flat sheet-shaped, the opening of the terminal cover generally leaves a relatively wide gap to allow the lead wires to move up and down.

An object of the present invention is to suppress the movement of the lead wires and the resultant moment acting on the terminal members and to maintain close contact between the terminals of the casing upper-portion and the terminal members of the lead wires so that more stable power supply to the motor can be achieved.

Means for Solving Problem

To solve the above-mentioned problem, a compressor according to one aspect of the present invention includes a casing, a compression mechanism housed in the casing, a motor housed in the casing and configured to drive the compression mechanism, a terminal provided on an upper portion of the casing and configured to be connectable to a lead wire for supplying power to the motor, a terminal cover arranged to surround the terminal, and a sealing member disposed between the terminal cover and the upper portion of the casing. The terminal cover includes an opening opened in a direction perpendicular to a central axis of the casing, and the lead wire can be led out from inside the terminal cover through the opening. The sealing member includes a sealing-member main-body and a protrusion. The sealing-member main-body is sheet-shaped and has a sealing portion to be sandwiched between the upper portion of the casing and an edge of the terminal cover that faces the upper portion. The protrusion is formed to protrude from the sealing-member main-body and occupies at least a part of a space of the opening in projection onto a plane parallel to the central axis of the casing.

Preferably, in this aspect, the upper portion of the casing is upwardly convex with respect to the central axis of the casing, the sealing member has elasticity in the sealing-member main-body and is disposed between the terminal cover and the upper portion of the casing in a state where the protrusion is in contact with the lead wire, and a gap for allowing downward deformation of the sealing-member main-body centered on the sealing portion is formed between the sealing-member main-body and the upper portion of the casing.

Preferably, in this aspect, the sealing-member main-body and the protrusion are integrally formed to constitute the sealing member.

Preferably, in this aspect, the sealing member is made of rubber, and the sealing-member main-body and the protrusion are formed by integral molding.

To solve the above-mentioned problem, a sealing member according to another aspect of the present invention is to be attached to a casing including a casing main-body, an upper portion, a bottom portion, and a terminal provided on the upper portion and to be disposed between the upper portion and a terminal cover surrounding the terminal. The casing is configured to house a compression mechanism and a motor in the casing main-body, the motor is a power source of the compression mechanism, and the terminal is connectable to a lead wire for supplying power to the motor. The terminal cover has an opening opened in a direction perpendicular to a central axis of the casing, and the lead wire can be led out from inside of the terminal cover through the opening. The sealing member includes a sealing-member main-body that is sheet-shaped and has a sealing portion to be sandwiched between the upper portion of the casing and an edge of the terminal cover that faces the upper portion, and a protrusion that is formed to protrude from the sealing-member main-body and, when the sealing member is attached to the casing, occupies at least a part of a space of the opening in projection onto a plane parallel to the central axis of the casing.

Effects of Invention

According to one aspect of the present invention, a movement of a lead wire and a resultant moment acting on its terminal member can be suppressed, and close contact between a terminal of an upper portion of a casing and the terminal member of the lead wire can be maintained. Therefore, more stable power supply to the motor can be achieved.

In another aspect of the present invention, a gap remaining in an opening of a terminal cover is narrowed by using a protrusion. This configuration makes it possible to suppress the movement of the lead wire in the opening of the terminal cover caused by bending of the lead wire due to its own weight and/or deformation due to action of external force, and thereby suppress the moment acting on the terminal member of the lead wire. As a result, satisfactory contact between the terminal and the terminal member of the lead wire can be maintained.

In a further aspect of the present invention, the sealing-member main-body is made elastic, and the sealing member is disposed with the protrusion in contact with the lead wire, the upper portion of the casing is formed into an upwardly convex shape, and a gap is formed between the sealing-member main-body and the upper portion of the casing so as to allow downward deformation of the sealing-member main-body. This configuration makes it possible to support the lead wire against its bending and/or deformation and more effectively suppress the moment acting on the terminal member of the lead wire.

In still another aspect of the present invention, the sealing-member main-body and the protrusion are integrally formed, which contributes to simplification of the configuration of the sealing member and reduction in the amount of work required for installing the sealing member.

Furthermore, the sealing-member main-body and protrusion can be managed as a single component, and thus, storage and management of the sealing member becomes easier.

In still another aspect of the present invention, the sealing-member main-body and the protrusion are formed by integral molding of a rubber material, which promotes improvement in productivity of the sealing member and contributes to reduction in manufacturing cost of the sealing member.

Moreover, by using a rubber material with appropriate flexibility, it is possible to suppress damage to the lead wire due to contact with the terminal cover while enhancing both the adhesion between the sealing-member main-body and the upper portion of the casing and the adhesion between the sealing-member main body and the terminal cover. This allows downsizing of the opening of the terminal cover as much as possible, and thereby, intrusion of foreign matters such as water and dust into the inside of the terminal cover can be suppressed.

DETAILED DESCRIPTION

Hereinbelow, embodiments of the present invention will be described by referring to the accompanying drawings.

Figure 1:
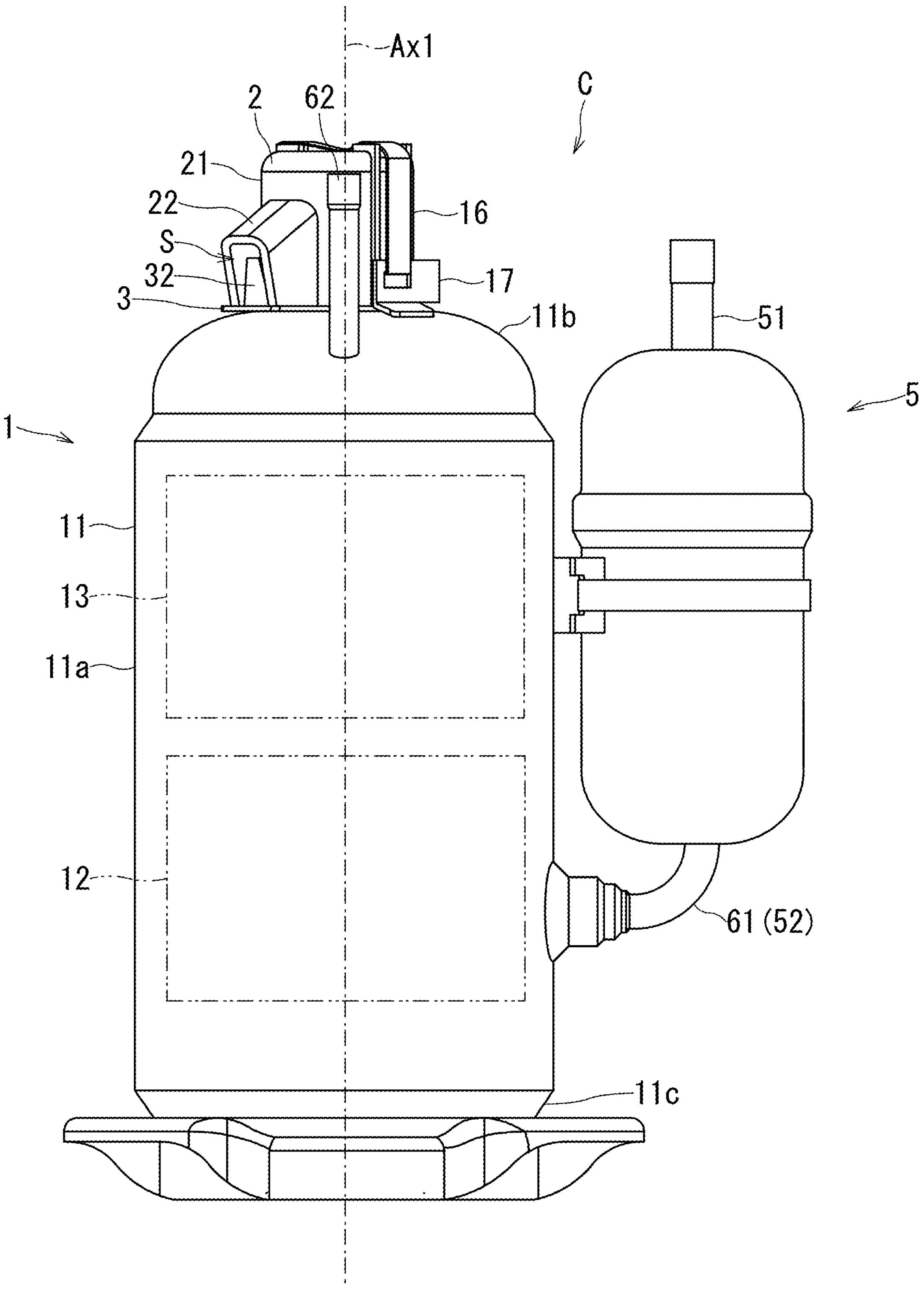
FIG. 1 is an elevational view illustrating a compressor according to one embodiment of the present invention in an installed state.
Figure 2:
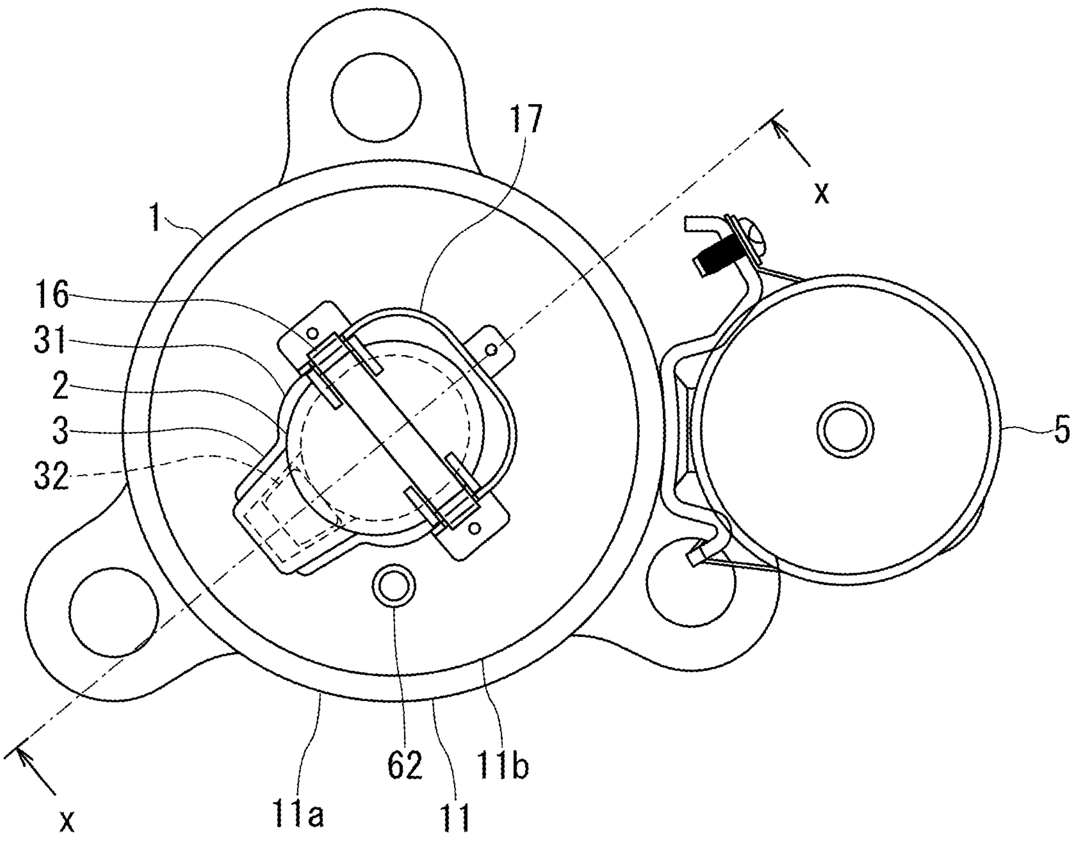
FIG. 2 is a plan view of the compressor according to the embodiment as viewed from above.

FIG. 1 and FIG. 2 illustrate a compressor C according to one embodiment of the present invention (hereinafter abbreviated as "the compressor C") in the state where it is installed in a refrigeration cycle apparatus. FIG. 1 is an elevational view of the compressor C as viewed from the side, and FIG. 2 is a plan view of the compressor C as viewed from above.

Figure 3:
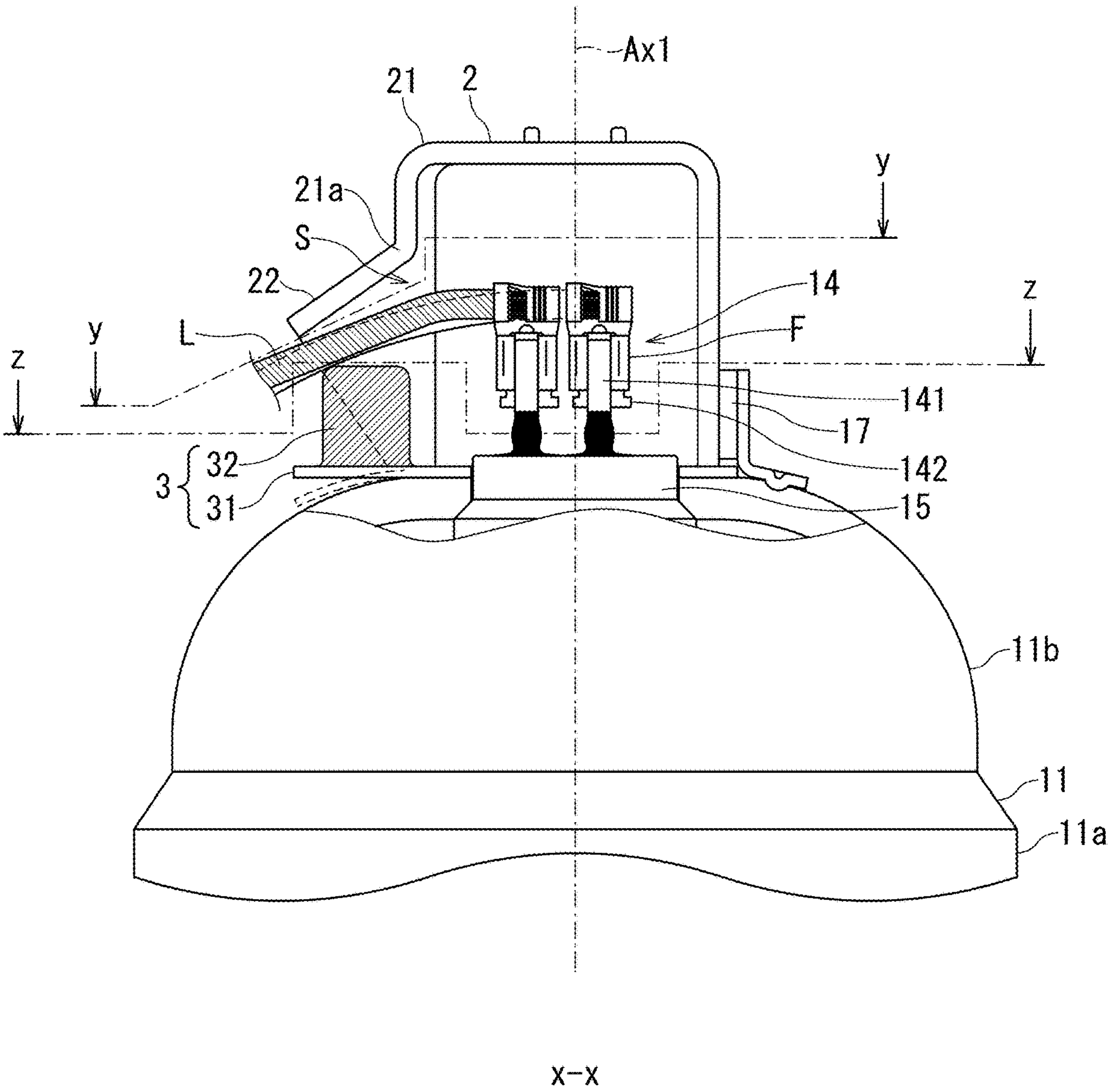
FIG. 3 is a cross-sectional view taken along the line x-x of FIG. 2 for illustrating an internal configuration of a terminal cover of the compressor according to the embodiment.
Figure 4:
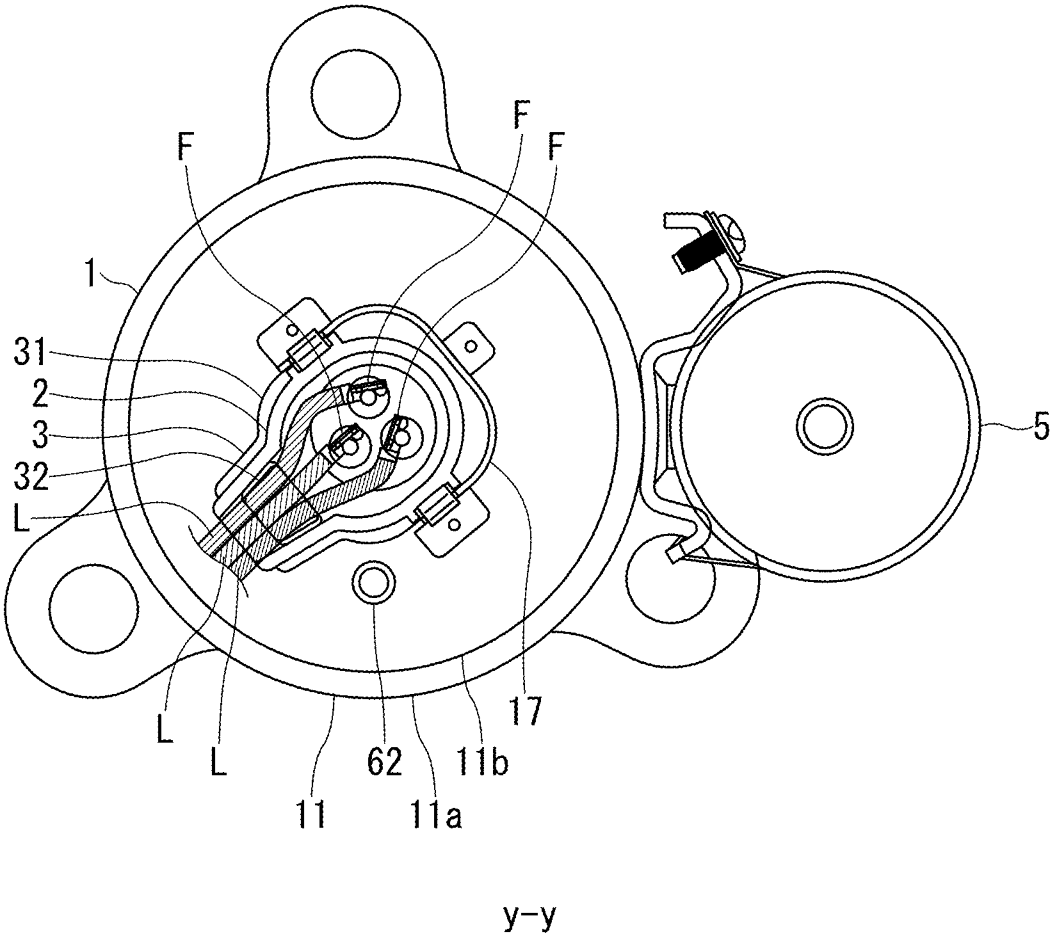
FIG. 4 is a cross-sectional view taken along the line y-y of FIG. 3 for illustrating the internal configuration of the terminal cover of the compressor according to the embodiment.
Figure 5:
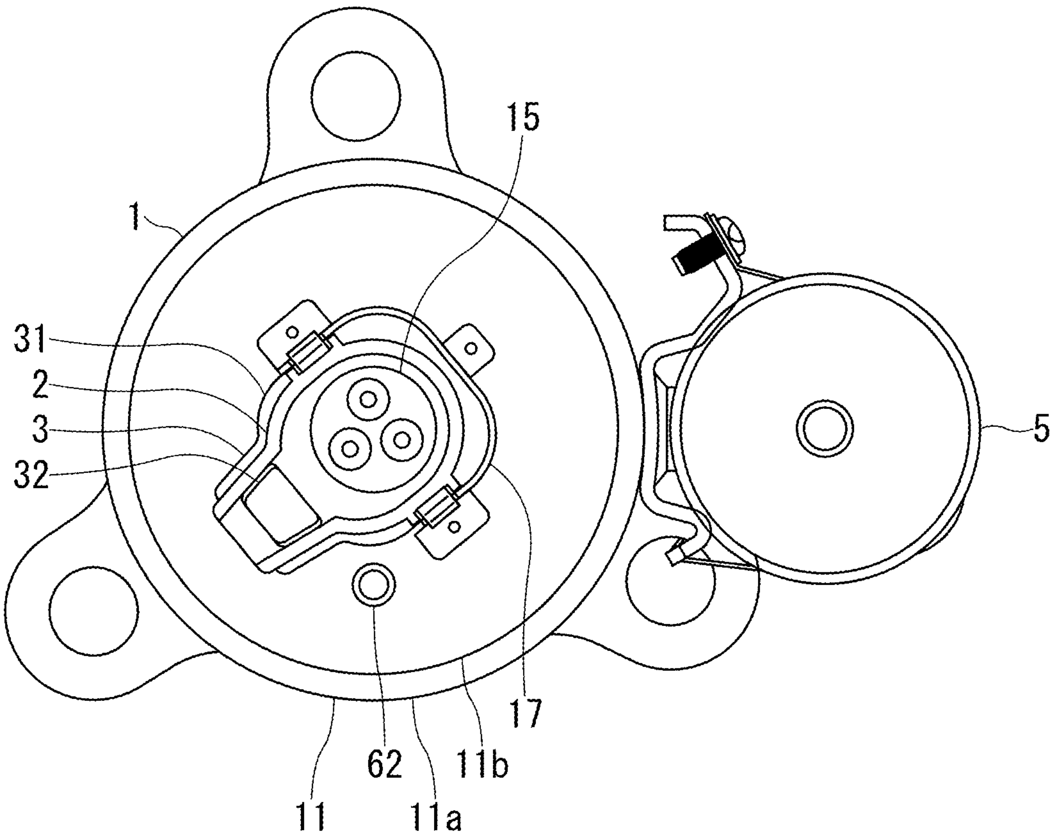
FIG. 5 is a cross-sectional view taken along the line z-z of FIG. 3 for illustrating the internal configuration of the terminal cover of the compressor according to the embodiment.

FIG. 3 to FIG. 5 illustrate an internal configuration of a terminal cover 2 of the compressor C. FIG. 3 is a cross-sectional view taken along the line x-x of FIG. 2, FIG. 4 is a cross-sectional view taken along the line y-y of FIG. 3, and FIG. 5 is a cross-sectional view taken along the line z-z of FIG. 3.

In the present embodiment, the compressor C is a so-called sealed rotary compressor. The compressor C is applied to a refrigeration cycle apparatus, sucks in a low-temperature and low-pressure refrigerant gas discharged from an evaporator, compresses it, and discharges it as high-temperature and high-pressure superheated vapor. The refrigerant discharged from the compressor C is supplied to a condenser. In the refrigeration cycle apparatus, the evaporator constitutes a heat receiving source, and the condenser constitutes a heat dissipating source. The evaporator, the compressor C, and the condenser are connected in this order with respect to a refrigerant flow by refrigerant piping. An expansion valve is installed between the condenser and the evaporator. The refrigeration cycle apparatus to which the compressor C can be applied includes a a freezer, a refrigerator, a water heater, and an air conditioner.

The compressor C includes a compressor main-body 1 and an accumulator 5. In the present embodiment, the compressor main-body 1 and the accumulator 5 are integrated and the accumulator 5 is configured as a component or part of the compressor C. Note that the accumulator 5 can also be configured as a refrigeration cycle component separate from the compressor C.

The compressor main-body 1 is connected to the accumulator 5 by a refrigerant suction pipe 61, and sucks in the refrigerant gas discharged from the evaporator through the accumulator 5.

The accumulator 5 is also called a suction muffler or a gas-liquid separator. When the refrigerant gas discharged from the evaporator is mixed with a refrigerant in the form of liquid or droplet other than vapor, the accumulator 5 separates the vapor from the liquid or droplets, discharges only the vapor, and causes the compressor main-body 1 to suck in the vapor. The accumulator 5 includes an inlet pipe 51 and an outlet pipe 52, and receives supply of the refrigerant gas through the inlet pipe 51. In the present embodiment, the outlet pipe 52 also serves as the refrigerant suction pipe 61 of the compressor main-body 1.

In the present embodiment, the compressor main-body 1 includes a casing 11, a compression mechanism 12, and a motor 13. The compression mechanism 12 and the motor 13 are both housed airtightly in the casing 11. For the sake of convenience, FIG. 1 schematically illustrates the respective contours of the compression mechanism 12 and the motor 13 by two-dot chain lines.

The casing 11 includes a casing main-body 11*a*, a casing upper-portion 11*b*, and a casing bottom portion 11*c*. The casing main-body 11*a* is cylindrical with a hollow space penetrating vertically, and has an internal space for housing the compression mechanism 12 and the motor 13. The casing upper-portion 11*b* is joined to the upper end of the casing main-body 11*a* and hermetically closes the opening at the upper end of the casing main-body 11*a*. The casing bottom portion 11*c* is joined to the lower end of the casing main-body 11*a*, and hermetically closes the opening at the lower end of the casing main-body 11*a*.

In the present embodiment, the casing upper-portion 11*b* and the casing bottom portion 11*c* are both formed of dish-shaped end plates and are joined to the casing main-body 11*a* by an appropriate method such as welding. The compressor C is installed vertically in such a manner that the central axis Ax1 of the casing 11 is vertical, i.e., the compression mechanism 12 and the motor 13 described below are stacked one above the other inside the casing 11.

The compression mechanism 12 is housed in the lower half of the casing main-body 11*a* inside the casing 11.

The motor 13 is housed in the upper half of the casing main-body 11*a* inside the casing 11.

The motor 13 constitutes the driving source of the compression mechanism 12 and is provided with a stator and a rotor. The stator is cylindrical and fixed to the casing main-body 11*a*. The rotor is disposed on the inner diameter side of the stator and is in the state of being rotatably supported with respect to the casing main-body 11*a*. The rotor of the motor 13 is connected to the compression mechanism 12 via a crankshaft, and the motor 13 rotates the rotor by energizing an electromagnetic coil formed on the stator and thereby applying electromagnetic force to the rotor. The motor 13 transmits the driving force in the rotational direction generated in the rotor toward the compression mechanism 12 via the crankshaft so as to drive the compression mechanism 12. In the present embodiment, the motor 13 is a three-phase induction motor.

The compression mechanism 12 includes a cylinder and a rolling piston. The cylinder is cylindrical and is fixed to the casing main-body 11*a* coaxially with the rotor and the crankshaft of the motor 13. The rolling piston is disposed on the inner diameter side of the cylinder and is supported eccentrically and rotatably with respect to the cylinder by an eccentric unit provided on the crankshaft. The compression mechanism 12 sucks in and compresses the refrigerant in accordance with rotation of the rolling piston inside the cylinder.

In the present embodiment, a groove is formed radially outward in the cylinder so as to be continuous from the space on the inner diameter side, and a partition plate (also called a vane) is housed in this groove. The partition plate slides against the outer peripheral surface of the rolling piston, and thereby, the space between the cylinder and the rolling piston is divided into a suction chamber and a compression chamber. The compressed refrigerant is discharged into the space inside the casing 11 and further into the condenser through the refrigerant discharge pipe 62.

Furthermore, lubricating oil is sealed in the casing bottom portion 11*c* and the lower half of the casing main-body 11*a*, and the compression mechanism 12 is submerged in this lubricating oil.

In addition to the above, the compressor main-body 1 further includes terminals 14, and the compressor C includes a terminal cover 2 and a sealing member 3 as components associated with the compressor main-body 1.

As shown in FIG. 3, the terminals 14 are installed in the casing upper-portion 11*b*. The terminals 14 serve as intermediate components and connect lead wires L outside the casing 11 to non-illustrated lead wires (also called "outlet wires" and hereinafter referred to as "the second lead wires"), which are inside the casing 11 and extend from the coil winding of the stator. Each lead wire L extends from a power source (e.g., commercial AC power source) of the motor 13 or a power converter such as an inverter, is also called a "power line", and is hereinafter referred to as "the first lead wire L". In the present embodiment, three terminals 14 are provided in accordance with the number of coil phases of the motor 13.

In the present embodiment, each terminal 14 is composed of a terminal pin 141 and a tab terminal 142. An installation base 15 is inserted into an insertion opening formed in the casing upper-portion 11*b*, and the terminals 14 are attached to the casing upper-portion 11*b* by this installation base 15. The installation base 15 ensures the insulation distance between the three terminals 14.

Specifically, the terminal pin 141 is fixed to the installation base 15 in the state where it penetrates the front and back of the installation base 15. The tab terminal 142 is in a shape of a flat plate and is fixed to the terminal pin 141 by welding or the like.

Referring to FIG. 4, in the state of being fixed to the terminal pin 141, the respective surfaces of the tab terminals 142 face in different directions. Of the planes of the respective tab terminals 142 constituting the three terminals 14, the plane including the surface of one tab terminal 142 is at a position by which the angle formed by the planes including the surfaces of the other two tab terminals 142 is divided into two.

In the present embodiment, the terminal pins 141 constituting the respective three terminals 14 are in a mutual relationship of being positioned at the vertices of an equilateral triangle. Of the planes of the respective three tab terminals 142, the planes including the surfaces of two tab terminals 142 intersect with each other so as to form an acute angle, and the plane including the surface of the remaining one tab terminal 142 is positioned so as to bisect this acute angle.

A Faston terminal F is attached to the tip of the first lead wire L. Attaching this Faston terminal F to the tab terminal 142 connects the first lead wire L to the second lead wire inside the casing 11 via the terminal 14 so as to enable power supply from the power source to the motor 13. In the present embodiment, in the state where the first lead wire L is connected to the terminal 14, the length direction of the terminal pin 141 and the length direction of the first lead wire L are perpendicular to each other, and the first lead wire L is pulled out from the terminal 14 in the lateral direction, i.e., in the direction perpendicular to the central axis Ax1 of the casing 11.

The terminal cover 2 is attached to the casing upper-portion 11*b*, surrounds the terminals 14 and the installation base 15, and protects them from contact with foreign matters such as water and dust. The terminal cover 2 includes a cover main-body 21 and an extended portion 22. In the present embodiment, the cover main-body 21 and the extended portion 22 are integrally formed from an appropriate material such as resin, and the terminal cover 2 is subjected to restriction from a fastening band 16 bridged over the cover main-body 2 so as to be attached to the casing upper-portion 11*b*. The fastening band 16 is fixed to the casing upper portion 11*b* via a collar-shaped guide member 17 that is provided so as to surround the cover main-body 21 over half of its circumference.

The cover main-body 21 is cylindrical with a lid and forms an internal space for housing the terminals 14. The cover main-body 21 further has an opening 21*a* in its side wall. In the state where the terminal cover 2 is attached to the casing upper-portion 11*b*, the opening 21*a* opens in the direction perpendicular to the central axis Ax1 of the casing 11.

The extended portion 22 is provided to be continuous with the opening 21*a*, and shields the space inside the terminal cover 2 from the outside when viewed from the outside of the terminal cover 2 in the direction perpendicular to the central axis Ax1 of the casing 11. In the present embodiment, the extended portion 22 is in a roof-shape extending from the opening 21*a*, has a downward slope toward the outside of the cover main-body 21, and extends from the opening 21*a* so as to block the line of sight toward the inside of the terminal cover 2 in the direction perpendicular to the central axis Ax1 of the casing 11. The first lead wire L connected to the terminal 14 is pulled out from the inside of the terminal cover 2 to the outside of the terminal cover 2 via the opening 21*a* and the extended portion 22.

The sealing member 3 is disposed between the terminal cover 2 and the casing upper-portion 11*b*.

Figure 6A:
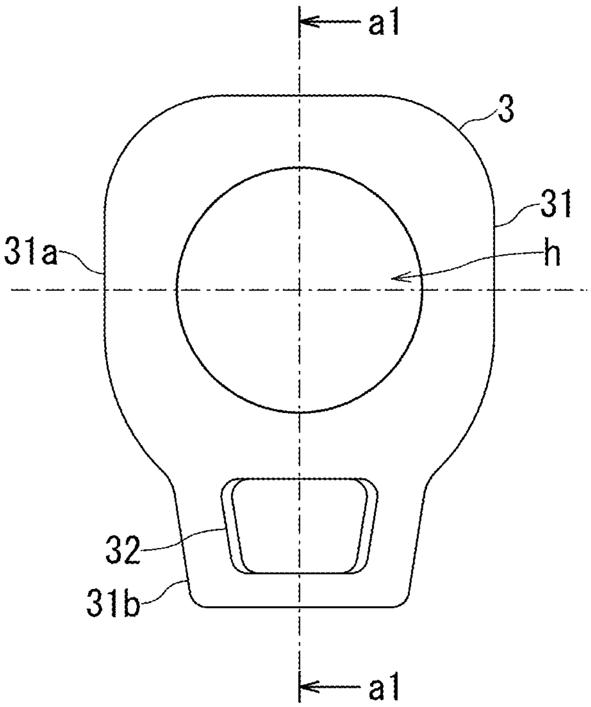
FIG. 6A to FIG. 6C are a plan view, a front view, and a cross-sectional view taken along the line a1-a1 for illustrating a configuration of the sealing member according to the embodiment, respectively.
Figure 6C:
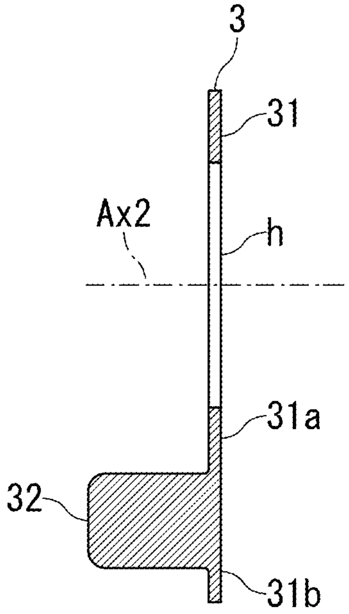
Figure 6B:
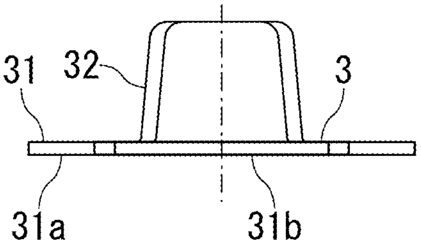

FIG. 6 illustrates a configuration of the sealing member 3 of the compressor C. FIG. 6A is a plan view of the sealing member 3, FIG. 6B is a front view of the sealing member 3, and FIG. 6C is a cross-sectional view of the sealing member 3 taken along the line a1-a1 of FIG. 6A.

The sealing member 3 includes a sealing-member main-body 31 and a protrusion 32. In the present embodiment, the sealing-member main-body 31 and the protrusion 32 are integrally formed, and the sealing member 3 is formed as a single member or a single part. Specifically, the entirety of the sealing member 3 including the protrusion 32 is made of a resin material, and the sealing-member main-body 31 and the protrusion 32 are integrally formed by molding or the like. Materials that can be used for the sealing member 3 include various natural or synthetic resin materials, such as a rubber material. Further, it is preferred that the sealing member 3 has a suitable elasticity not only in the sealing-member main-body 31 but also in the protrusion 32.

The sealing-member main-body 31 is in the form of a flat sheet as a whole, and includes a sealing portion 31*a* and a tongue-shaped portion 31*b*.

The sealing portion 31*a* is sandwiched between the edge of the terminal cover 2 and the casing upper-portion 11*b* facing each other in the state where the terminal cover 2 is attached to the casing upper-portion 11*b*, and provides liquid-tight sealing properties to the joining surfaces of these portions. In the present embodiment, the sealing portion 31*a* is located between the edge of the cover main-body 21 and the casing upper-portion 11*b* facing this. The sealing-member main-body 31 has an insertion opening h into which the installation base 15 of the terminals 14 can be inserted, and the sealing portion 31*a* surrounds the insertion opening h over its entire circumference.

The tongue-shaped portion 31*b* is formed as an extended portion that extends radially outward from the sealing portion 31*a* with respect to the center line Ax2 of the insertion hole h. As shown in FIG. 3, in the state where the terminal cover 2 is attached to the casing upper-portion 11*b*, the tongue-shaped portion 31*b* contacts the edge of the extended portion 22 of the terminal cover 2. In the present embodiment, the tongue-shaped portion 31*b* prevents foreign matters from entering the inside of the terminal cover 2 through the opening 21*a* by blocking the extended portion 22 from below, and also supports the protrusion 32 described below so as to contribute to fixing of its position.

The protrusion 32 is formed by protruding from the tongue-shaped portion 31*b* of the sealing-member main-body 31 in the direction parallel to the central axis Ax2 of the insertion hole h, and occupies a part of the space S of the opening 21*a* in the projection onto a plane parallel to the central axis Ax1 of the casing 11. In other words, at least a part of the projection of the protrusion 32 onto the plane parallel to the central axis Ax1 of the casing 11 overlaps with the projection of the space S of the opening 21*a*.

Here, "To occupy a part of the space of the opening 21*a*" means excluding a state where the protrusion 32 occupies the entire space S of the opening 21*a*, i.e., means leaving a gap for at least the first lead wire L to pass through at the time of pulling out the first lead wire L from the inside of the terminal cover 2 to the outside of the terminal cover 2. In the present embodiment, as shown in FIG. 3, the protrusion 32 is entirely located within the space of the extended portion 22 that continues from the opening 21*a*, and the entire projection onto a plane parallel to the central axis Ax1 of the casing 11 overlaps with the projection of the space S of the opening 21*a*. Further, the entire projection of the protrusion 32 onto a plane perpendicular to the central axis Ax1 of the casing 11 overlaps with the projection of the space of the extended portion 22.

In the present embodiment, "the projection onto a plane parallel to the central axis Ax1 of the casing 11" is the projection onto a plane that is parallel to the central axis Ax1 of the casing 11 and maximizes projected area of the protrusion 32, and generally corresponds to a plane perpendicular to the first lead wire L to be pulled out of the terminal 14 near the center of the opening 21*a* in a plan view shown in FIG. 4.

In the state where the terminal cover 2 is attached to the casing upper-portion 11*b*, the upper end of the protrusion 32 contacts the first lead wire L as shown in FIG. 3. In other words, the first lead wire L is sandwiched between the extended portion 22 and the protrusion 32 from above and below, is supported upward by the protrusion 32 from below, and is in the state of being elastically pressed against the extended portion 22.

A slight gap is left between the casing upper-portion 11*b* and the tongue-shaped portion 31*b* of the sealing-member main-body 31, and the sealing-member main-body 31 can bend or deform downward around the sealing portion 31*a* by the application of force to the tongue-shaped portion 31*b* or the protrusion 32. For example, the sealing-member main-body 31 can deform so as to follow the first lead wire L when the first lead wire L is pushed downward. FIG. 3 schematically illustrates the outline of the sealing-member main-body 31 after deformation by a dashed line.

Of the casing upper portion 11*b*, the portion around the terminals 14 is formed as a flat surface, and its surrounding region is formed as a convex curved surface in the present embodiment. The sealing-member main-body 31 is configured such that the sealing portion 31*a* gathers at the boundary between the convex curved surface and the flat surface of the casing upper-portion 11*b* or straddles this boundary. In the normal state where the first lead wire L is not under load or is under load but the load is not very large, the above-described configuration brings the tongue-shaped portion 31*b* into the state where its end is raised above the casing upper-portion 11*b*, and when the first lead wire L is pushed downward, the tongue-shaped portion 31*b* moves downward along with the protrusion 32, following the first lead wire L.

This allows the edge of the terminal cover 2 to firmly press the sealing portion 31*a* of the sealing-member main-body 31 against the casing upper-portion 11*b*, particularly against the portion forming the flat surface around the terminals 14, can provide a moderate elastic force by the tongue-shaped portion 31*b* extending outward from the sealing portion 31*a* while ensuring satisfactory sealing properties, and can ensure appropriate followability to the first lead wire L.

Furthermore, even if the sealing-member main-body 31 is so thin that the required elastic force cannot be obtained by the sealing-member main-body 31, the appropriate followability to the first lead wire L can be achieved by adjusting the elastic force of the protrusion 32.

The compressor C and the sealing member 3 according to the present embodiment have the above-described configuration, and the effects to be obtained by the present embodiment are described below.

Firstly, the sealing member 3 is provided with the sheet-shaped sealing-member main-body 31 and the protrusion 32 formed by protruding from the sealing-member main-body 31, and in the projection onto a plane parallel to the central axis Ax1 of the casing 11, the protrusion 32 occupies at least a part of the space S of the opening 21*a* of the terminal cover 2. This configuration reduces the gap remaining in the opening 21*a* of the terminal cover 2, and prevents the first lead wire L from moving in the opening 21*a* of the terminal cover 2. For example, this configuration prevents the first lead wire L from sagging from the connection portion to the terminals 14 (i.e., the position of the Faston terminal F in the present embodiment) due to bending of the first lead wire L caused by its own weight and/or due to deformation caused by the action of external force, and suppresses a situation where the moment acts on the Faston terminal F.

Consequently, it is possible to maintain satisfactory contact between the terminal 14 and the first lead wire L, and in the present embodiment, especially between the tab terminal 142 and the Faston terminal F, which contributes to achievement of more stable power supply to the motor 13.

Specifically, the movement of the first lead wire L causes a downward moment to act on the Faston terminal F, which may cause the connection portion between the Faston terminal F and the tab terminal 142 to loosen, reducing the contact area between both and resulting in shortage of the contact area. However, the action of the moment on the Faston terminal F can be suppressed by supporting the first lead wire L with the protrusion 32 and thereby restricting its movement, and consequently, shortage of the contact area due to loosening of the connection portion can be avoided.

Further, the advantage concomitantly with the reduction in the gap remaining in the opening 21*a* of the terminal cover 2, in addition to suppressing bending and/or deformation occurring in the first lead wire L, the above configuration can avoid a situation where vibrations from the motor 13 or other peripheral devices housed in the casing 11 cause variation in the first lead wire L so as to impose an excessive load on the Faston terminal F.

Figure 7:
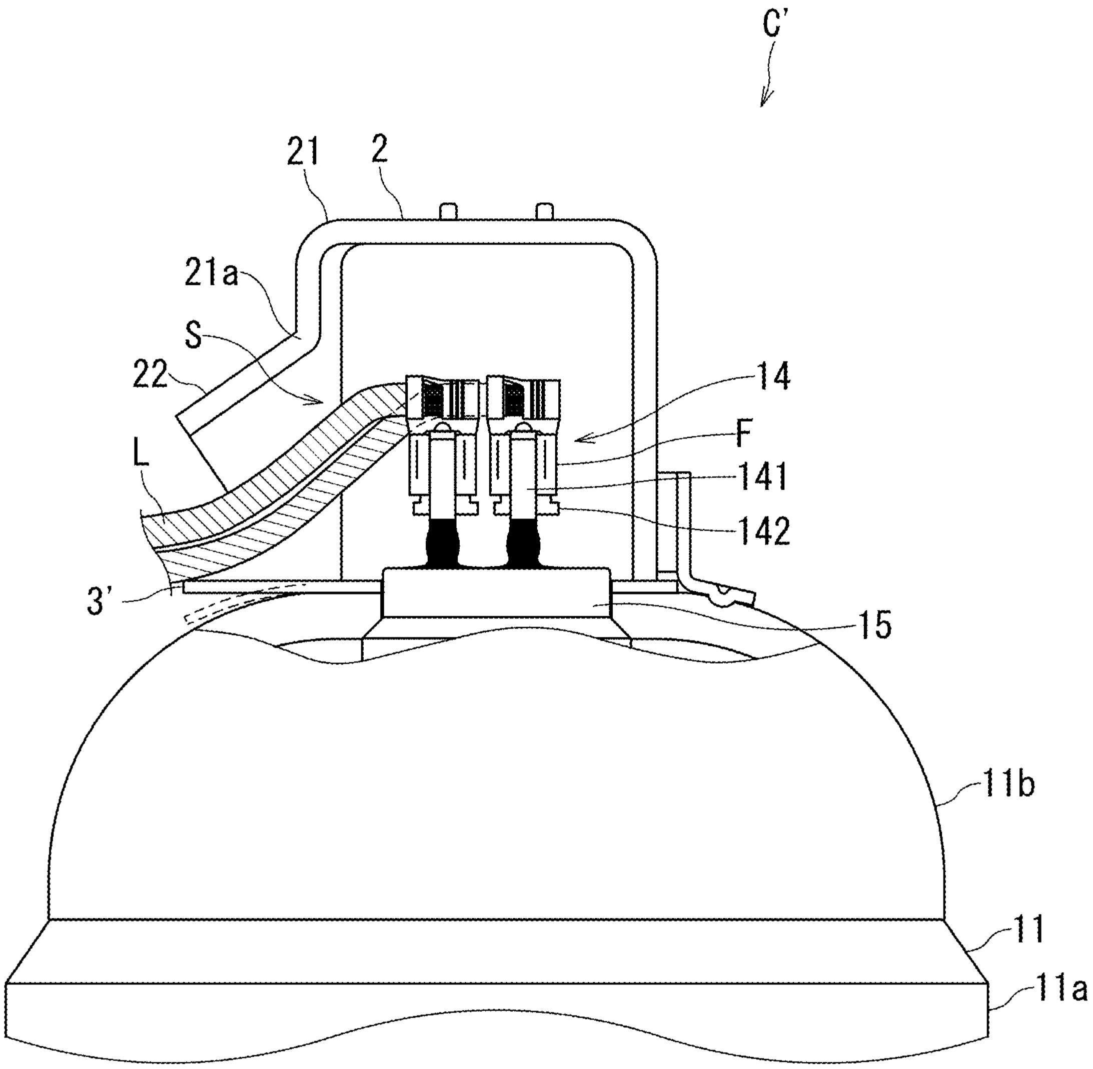
FIG. 7 is a cross-sectional view taken along a line similar to the line x-x of FIG. 2 for illustrating a configuration of a terminal cover of a compressor according to a comparative example.

FIG. 7 is a cross-sectional view taken along a line similar to the section line in FIG. 3 (line x-x of FIG. 2) for illustrating the internal configuration of the terminal cover 2 of a compressor C' according to a comparative example.

Figure 8A:
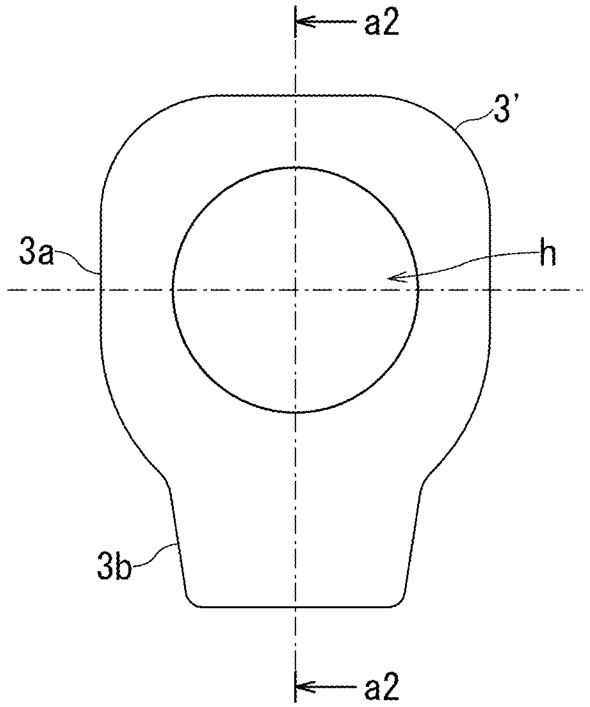
FIG. 8A to FIG. 8C are a plan view, a front view, and a cross-sectional view taken along the line a2-a2 for illustrating a configuration of a sealing member according to the comparative example, respectively.
Figure 8C:
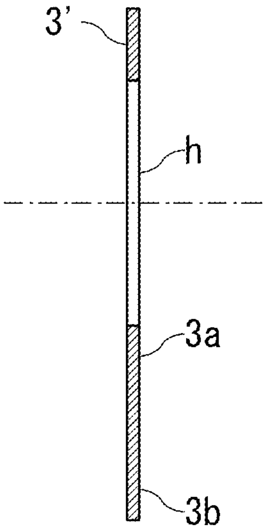
Figure 8B:
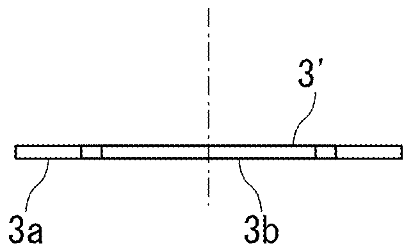

FIG. 8A to FIG. 8C illustrate an internal configuration of a sealing member 3' of the compressor C' according to the comparative example. FIG. 8A is a plan view of the sealing member 3', FIG. 8B is a front view of the sealing member 3', and FIG. 8C is a cross-sectional view taken along the line a2-a2 of FIG. 8A.

In FIG. 7 and FIG. 8A to FIG. 8C, the same components as those in the compressor C in the present embodiment are denoted by the same reference signs as in FIG. 3 and FIG. 6, and duplicate descriptions are omitted.

In the comparative example, the protrusion 32 is not provided in the sealing member 3', and the sealing member 3' is formed only from the components corresponding to the sealing-member main-body 31 and is formed into a flat sheet as a whole. As a result, under the state where the terminal cover 2 is attached to the casing upper portion 11*b*, the opening 21*a* of the terminal cover 2 has enough room to allow the movement of the first lead wire L. Thus, when the first lead wire L moves due to bending caused by its own weight and/or due to deformation caused by external force, a moment corresponding to this movement acts on the Faston terminal F to be connected to the tab terminal 142 of the terminal 14. This causes the connection portion between the tab terminal 142 and the Faston terminal F to become loose so as to reduce the contact area between both, and thereby leads to heat generation due to loose connection and/or a loss of stability in the power supply to the motor 13, in some cases.

The present embodiment can avoid the above-described situation, and contributes to achievement of more stable power supply to the motor 13.

Secondly, the sealing-member main-body 31 is made elastic, and the sealing member 3 is disposed in the state where the protrusion 32 is in contact with the first lead wire L, the casing upper-portion 11*b* is shaped to be upwardly convex, and a gap is formed between the sealing-member main-body 31 and the casing upper-portion 11*b* to allow downward deformation of the sealing-member main-body 31. This configuration elastically supports the first lead wire L against its bending and/or deformation, and can more effectively suppress a situation where the moment acts on the Faston terminal F.

Thirdly, the sealing-member main-body 31 and the protrusion 32 are integrally formed, and thus, the structure of the sealing member 3 can be simplified, which contributes to reduction in labor required for installing the sealing member 3.

Since the sealing-member main-body 31 and the protrusion 32 can be managed as a single component, storage and management of the sealing member 3 become easier.

Fourthly, the sealing-member main-body 31 and the protrusion 32 are formed by integral molding of a rubber material, which prompts improvement in productivity of the sealing member 3 and can reduce the manufacturing cost of the sealing member 3.

Using a rubber material with appropriate flexibility can suppress damage to the first lead wire L due to contact with the sealing member 3, especially with the protrusion 32, while increasing both the adhesion between the sealing-member main-body 31 and the casing upper-portion 11*b* and the adhesion between the sealing-member main-body 31 and the terminal cover 2. This can prevent foreign matters such as water and dust from entering the inside of the terminal cover 2 by narrowing the gap remaining in the opening 21*a* of the terminal cover 2 as much as possible.

Further, the sealing member 3, especially the sealing-member main-body 31 is flexible, and thereby, the protrusion 32 elastically supports the first lead wire L so as to suppress the movement of the first lead wire L due to its bending and/or deformation. As a result, when the first lead wire L is deformed due to the action of external force, the first lead wire L is deformed to follow the deformation, preventing the first lead wire L from being subjected to an excessive load. This facilitates the work operating and routing the first lead wire L at the time of installing the compressor C, for example.

Although the sealing-member main-body 31 and the protrusion 32 are integrally formed from the same material and the sealing member 3 is formed as a single member in the above description, the sealing member 3 is not limited to such a configuration. The sealing-member main-body 31 and the protrusion 32 can be formed separately from the same or different materials, both can be formed separately from the same material, and both can be formed integrally from different materials. For example, the sealing-member main-body 31 is formed from a flexible resin material such as rubber, whereas the protrusion 32 is formed integrally with or separately from the sealing-member main-body 31 by using a material harder than the sealing-member main-body 31, such as a hard plastic material.

In the terminal cover 2, the entirety of the protrusion 32 is disposed in the extended portion 22 in the above description. However, disposition of the protrusion 32 is not limited to such an aspect, and a part of the protrusion 32 may be disposed outside the extended portion 22. Specifically, a part of the protrusion 32 is disposed in the extended portion 22, while the remaining parts are disposed in the cover main-body 21 or outside the terminal cover 2. Additionally, the entirety of the protrusion 32 may be located outside the extended portion 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

C compressor
1 compressor main-body
11 casing
11*a* casing main-body
11*b* casing upper portion
11*c* casing bottom portion
12 compression mechanism
13 motor
14 terminal
141 terminal pin
142 tab terminal
15 installation base
16 fastening band
2 terminal cover
21 cover main-body
21*a* opening
22 extended portion
3 sealing member
31 sealing-member main-body
31*a* sealing portion
31*b* tongue-shaped portion
32 protrusion
5 accumulator
51 inlet pipe
61 refrigerant suction pipe
62 refrigerant discharge pipe
F Faston terminal
L first lead wire
S space of the opening

The invention claimed is:

1. A compressor comprising:
a casing;
a compression mechanism housed in the casing;
a motor housed in the casing and configured to drive the compression mechanism;
a terminal provided on an upper portion of the casing and configured to be connectable to a lead wire configured to supply power to the motor;
a terminal cover arranged to surround the terminal, the terminal cover including an opening opened in a direction perpendicular to a central axis of the casing, the opening being configured so that the lead wire is able to be led out from inside the terminal cover through the opening; and
a sealing member disposed between the terminal cover and the upper portion of the casing and including a sealing-member main-body and a protrusion,
the sealing-member main-body being sheet-shaped and including a sealing portion configured to be sandwiched between the upper portion of the casing and an edge of the terminal cover that faces the upper portion,
the protrusion being formed to protrude from the sealing-member main-body and occupying at least a part of a space of the opening in projection onto a plane parallel to the central axis of the casing.

2. The compressor according to claim 1, wherein the sealing-member main-body and the protrusion are integrally formed to constitute the sealing member.

3. The compressor according to claim 2, wherein:
the sealing member is made of rubber; and
the sealing-member main-body and the protrusion are formed by integral molding.

4. The compressor according to claim 1, wherein:
the upper portion of the casing is upwardly convex with respect to the central axis of the casing;
the sealing member has elasticity in the sealing-member main-body and is disposed between the terminal cover and the upper portion of the casing in a state where the protrusion is in contact with the lead wire; and
a gap for allowing downward deformation of the sealing-member main-body centered on the sealing portion is formed between the sealing-member main-body and the upper portion of the casing.

5. The compressor according to claim 4, wherein the sealing-member main-body and the protrusion are integrally formed to constitute the sealing member.

6. The compressor according to claim 5, wherein:

the sealing member is made of rubber; and the sealing-member main-body and the protrusion are formed by integral molding.

7. A sealing member comprising:

a sealing-member main body that is sheet-shaped and includes a sealing portion; and a protrusion that is formed to protrude from the sealing-member main body; wherein:

the sealing member is configured to be attached to a casing including a casing main-body, an upper portion, a bottom portion, and a terminal provided on the upper portion, the sealing member is configured to be disposed between the upper portion and a terminal cover surrounding the terminal, the casing is configured to house a compression mechanism and a motor in the casing main-body, the motor is a power source of the compression mechanism, the terminal is connectable to a lead wire configured to supply power to the motor, the terminal cover has an opening opened in a direction perpendicular to a central axis of the casing, the opening being configured so that the lead wire is able to be led out from inside the terminal cover through the opening, the sealing portion is configured to be sandwiched between the upper portion of the casing and an edge of the terminal cover that faces the upper portion, and when the sealing member is attached to the casing, the protrusion occupies at least a part of a space of the opening in projection onto a plane parallel to the central axis of the casing.

* * * * *